(12) United States Patent
Sai

(10) Patent No.: US 12,512,900 B2
(45) Date of Patent: Dec. 30, 2025

(54) COMMUNICATION CONTROL APPARATUS, PROGRAM, FLIGHT VEHICLE, AND COMMUNICATION CONTROL METHOD

(71) Applicant: SoftBank Corp., Tokyo (JP)

(72) Inventor: Jutatsu Sai, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 19/074,415

(22) Filed: Mar. 9, 2025

(65) Prior Publication Data

US 2025/0211322 A1    Jun. 26, 2025

Related U.S. Application Data

(63) Continuation of application No. PCT/JP2024/001980, filed on Jan. 24, 2024.

(30) Foreign Application Priority Data

Jan. 26, 2023 (JP) .................. 2023-010017

(51) Int. Cl.
*H04B 7/185* (2006.01)
(52) U.S. Cl.
CPC ................ *H04B 7/18504* (2013.01)
(58) Field of Classification Search
CPC  H04B 7/18504; H04B 7/0408; H04B 7/0617; H04B 7/18506; H04B 17/347;
(Continued)

(56) References Cited

U.S. PATENT DOCUMENTS

| 6,018,659 A * | 1/2000 | Ayyagari | ............ H04B 7/18504 |
| | | | 342/450 |
| 2010/0142441 A1* | 6/2010 | Toda | ....................... H04J 99/00 |
| | | | 370/328 |

(Continued)

FOREIGN PATENT DOCUMENTS

| JP | 2018157522 A | 10/2018 |
| JP | 2021114753 A | 8/2021 |

(Continued)

OTHER PUBLICATIONS

Office Action issued for counterpart Japanese Application No. 2023-010017, transmitted from the Japanese Patent Office on Apr. 25, 2023 (drafted on Apr. 21, 2023).

(Continued)

*Primary Examiner* — Kenneth T Lam

(57) ABSTRACT

Provided is a communication control apparatus which is mounted on a flight vehicle and forms, by using a phased array antenna, a wireless communication area on a ground to provide a wireless communication service to a user terminal in the wireless communication area, the communication control apparatus including: a position information acquisition unit which acquires position information including an altitude of the flight vehicle; a calculation unit which calculates a number of transmission beams output by the phased array antenna, a tilt angle of each beam, and a number of antenna elements used to output each transmission beam, based on the altitude of the flight vehicle; a communication control unit which controls the phased array antenna to output transmission beams according to a result of calculation by the calculation unit.

6 Claims, 15 Drawing Sheets

(58) Field of Classification Search
CPC ..... H04W 84/06; H04W 16/26; H04W 16/28; Y02D 30/70
See application file for complete search history.

(56) References Cited

U.S. PATENT DOCUMENTS

| | | | | |
|---|---|---|---|---|
| 2012/0249366 | A1* | 10/2012 | Pozgay | H04B 7/18571 342/354 |
| 2016/0112116 | A1* | 4/2016 | Jalali | H04W 16/28 370/252 |
| 2019/0173201 | A1* | 6/2019 | Chen | H01Q 3/28 |
| 2020/0287617 | A1* | 9/2020 | Bienas | H04B 7/18506 |
| 2020/0322017 | A1* | 10/2020 | Lee | H04B 7/0695 |
| 2021/0099893 | A1* | 4/2021 | Suzuki | H04W 16/28 |
| 2022/0150719 | A1* | 5/2022 | Park | H04W 16/28 |
| 2022/0209845 | A1* | 6/2022 | Hirai | H04B 7/2041 |
| 2022/0294518 | A1* | 9/2022 | Hsieh | H04B 7/18515 |
| 2023/0040432 | A1* | 2/2023 | Su | H01Q 1/28 |
| 2023/0254025 | A1* | 8/2023 | Kumar | H04W 24/10 370/252 |

FOREIGN PATENT DOCUMENTS

| | | |
|---|---|---|
| WO | 2008053754 A1 | 5/2008 |
| WO | 2021095315 A1 | 5/2021 |
| WO | 2021114842 A1 | 6/2021 |

OTHER PUBLICATIONS

Decision to Grant a Patent issued for counterpart Japanese Application No. 2023-010017, transmitted from the Japanese Patent Office on Jun. 6, 2023 (drafted on May 29, 2023).

* cited by examiner

COMMUNICATION CONTROL APPARATUS, PROGRAM, FLIGHT VEHICLE, AND COMMUNICATION CONTROL METHOD

The contents of the following patent application(s) are incorporated herein by reference:
NO. 2023-010017 filed in JP on Jan. 26, 2023
NO. PCT/JP2024/001980 filed in WO on Jan. 24, 2024.

BACKGROUND

1. Technical Field

The present invention relates to a communication control apparatus, a program, a flight vehicle, and a communication control method.

2. Related Art

Patent Document 1 describes a phased array antenna mounted on high altitude platform station (HAPS).

PRIOR ART DOCUMENT

Patent Document

Patent Document 1: Japanese Patent Application Publication No. 2021-114753

DESCRIPTION OF EXEMPLARY EMBODIMENTS

When a phased array antenna is operated with HAPS, wireless coverage is determined by a scan angle of the antenna. In order to enable communication in all areas within the wireless coverage, it is necessary to deliver aircraft position information (beacon broadcast) to all the areas. When transmitting the beacon broadcast through the phased array antenna, a link budget and a transmission beam width need to be considered. Depending on a flight status (vertical position) of a HAPS aircraft, a communication distance to a ground changes, and the link budget changes. When the wireless link budget changes, if a beam width (gain) is constant, an area is formed where a transmission signal does not reach or the beacon broadcast cannot be delivered. A HAPS 100 according to the present embodiment adjusts a number of transmission elements of the phased array antenna such that the beacon broadcast can be delivered to all the areas in accordance with an aircraft altitude.

Hereinafter, the present invention will be described through embodiments of the invention, but the following embodiments do not limit the invention according to claims. In addition, not all combinations of features described in the embodiments are essential to a solution of the invention.

Figure 1:
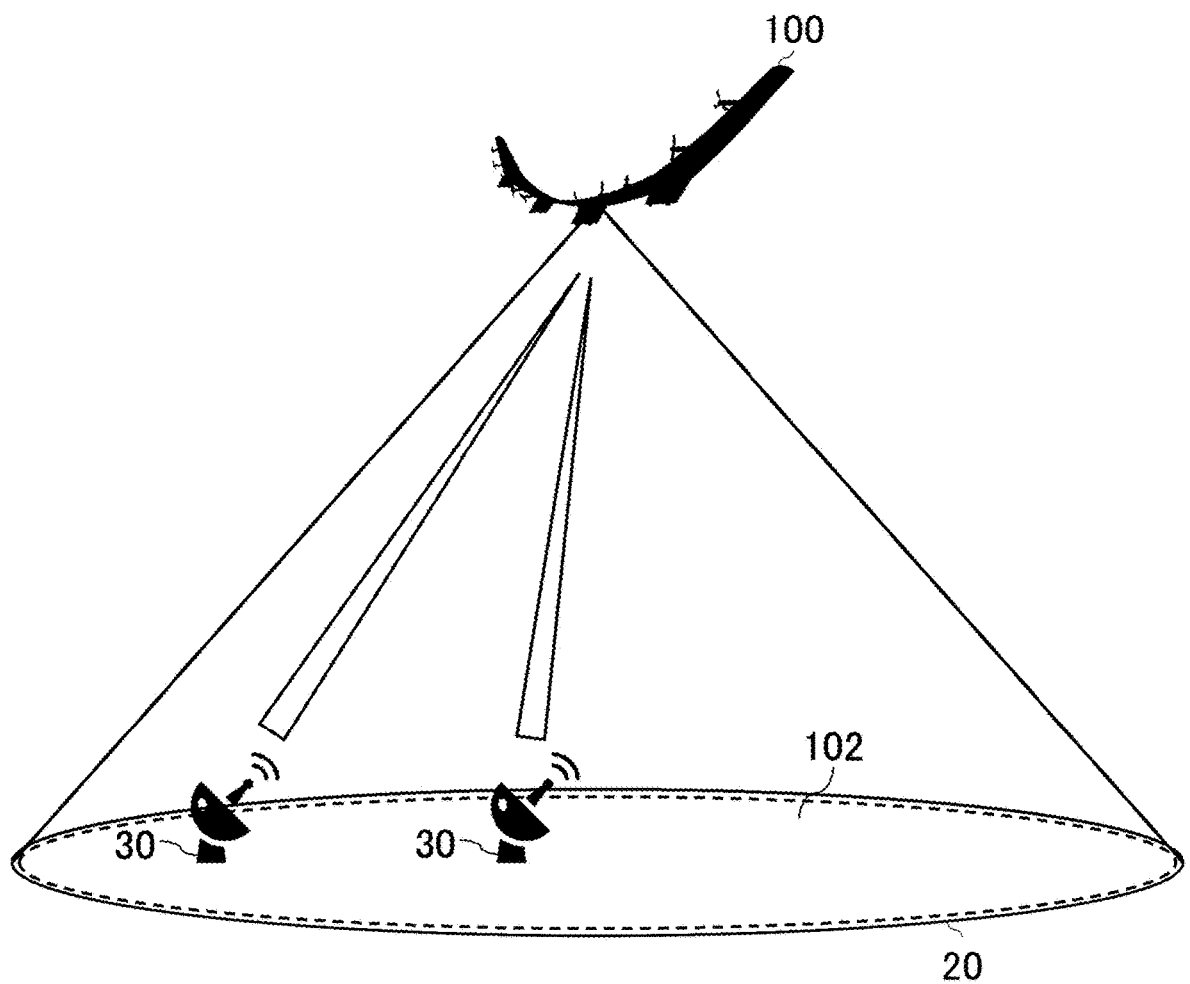
FIG. 1 schematically illustrates an example of a HAPS 100.
Figure 2:
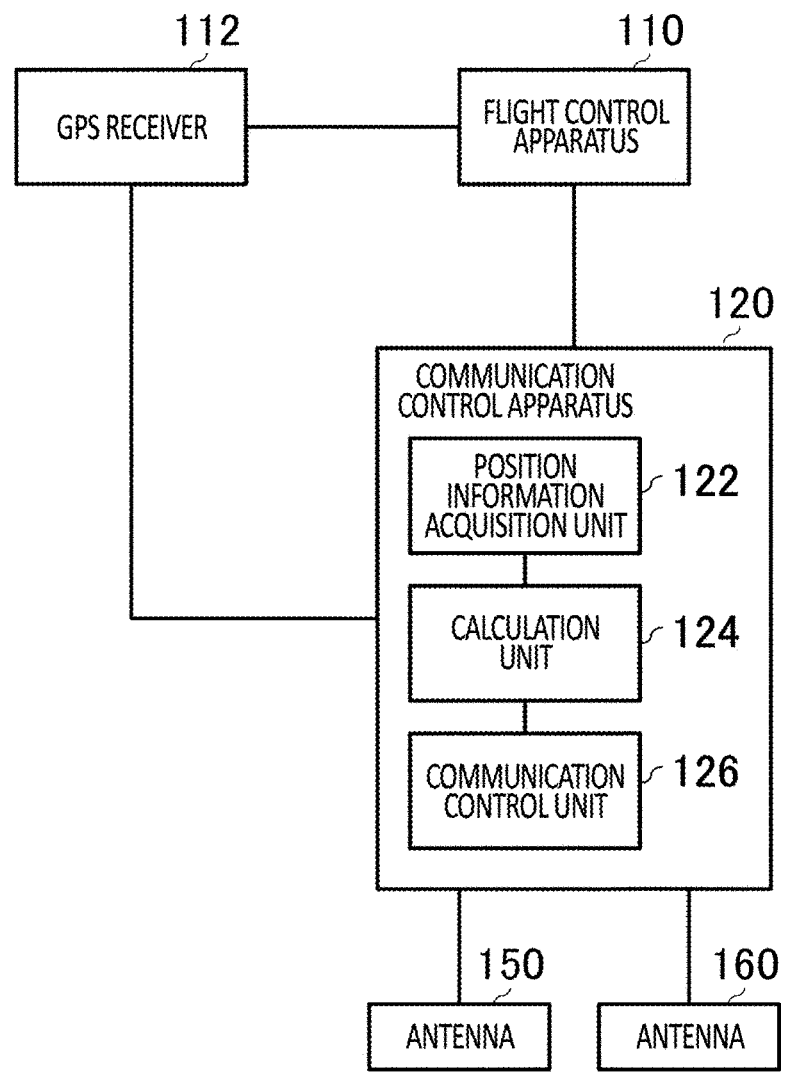
FIG. 2 schematically illustrates an example of a beacon broadcast area 104 by an antenna 150.

FIG. 1 schematically illustrates an example of the HAPS 100. FIG. 2 schematically illustrates an example of a functional configuration of the HAPS 100.

The HAPS 100 may be an example of a flight vehicle. The HAPS 100 may function as a stratospheric platform. The HAPS 100 may form a feeder link or a backhaul link with ground wireless communication equipment while flying in a stratosphere. The HAPS 100 forms a wireless communication area 102 in a coverage area 20 on the ground by emitting a beam toward the ground. The HAPS 100 provides a wireless communication service to a user terminal within the wireless communication area 102.

The HAPS 100 includes a flight control apparatus 110, a global positioning system (GPS) receiver 112, a communication control apparatus 120, an antenna 150, and an antenna 160. The flight control apparatus 110 controls a flight of the HAPS 100. The communication control apparatus 120 controls communication of the HAPS 100.

The flight control apparatus 110 controls the flight of the HAPS 100, for example, by controlling a rotation of a propeller, an angle of a flap or an elevator, and the like. The GPS receiver 112 acquires position information of the HAPS 100. The position information of the HAPS 100 may include a latitude, a longitude, and an altitude of the HAPS 100. The flight control apparatus 110 acquires the position information of the HAPS 100 from the GPS receiver 112. The flight control apparatus 110 may continuously acquire the position information of the HAPS 100 from the GPS receiver 112. The flight control apparatus 110 may acquire the position information of the HAPS 100, for example, at arbitrary time intervals, such as 5 ms.

The flight control apparatus 110 may manage various sensors included in the HAPS 100. Examples of the sensors include a gyro sensor, an acceleration sensor, a wind sensor, and the like. The flight control apparatus 110 may manage a position, an attitude, a moving direction, a moving speed, and the like of the HAPS 100 according to outputs of the various sensors.

The communication control apparatus 120 includes a position information acquisition unit 122, a calculation unit 124, and a communication control unit 126. The position information acquisition unit 122 acquires the position information of the HAPS 100. The position information acquisition unit 122 acquires the position information of the HAPS 100 from the GPS receiver 112. The position information acquisition unit 122 may continuously acquire the position information of the HAPS 100 from the GPS receiver 112. The position information acquisition unit 122 may acquire the position information of the HAPS 100, for example, at arbitrary time intervals, such as 5 ms.

The calculation unit 124 executes various types of calculation. The communication control unit 126 controls the communication of the HAPS 100. The communication control unit 126 communicates with a ground radio device 30 by using the antenna 150. The antenna 150 may be a phased array antenna. The communication control unit 126 communicates with the user terminal on the ground by using the antenna 160. The antenna 160 may be a phased array antenna.

The communication control apparatus 120 communicates with a ground network via the ground radio device 30, for example, and relays communication between the user terminal and the ground network. The ground network may include a core network managed by a telecommunications carrier. The core network may conform to a Long Term Evolution (LTE) communication standard. The core network may conform to a 5th Generation (5G) communication standard. The core network may conform to a 3rd Generation (3G) communication standard, or may conform to a 6th generation (6G) communication standard and subsequent communication standard. The ground network may include the Internet.

The user terminal may be any communication terminal as long as the user terminal can communicate with the HAPS 100. For example, the user terminal is a mobile phone such as a smartphone. The user terminal may be a tablet terminal, a personal computer (PC), or the like. The user terminal may be a so-called Internet of Thing (IoT) device. The user terminal may include anything corresponding to so-called Internet of Everything (IoE).

The HAPS 100 may circle above the coverage area 20 in order to cover the coverage area 20. For example, the HAPS 100 may perform a patrol flight above the coverage area 20 along on a predetermined flight path such as a circular, D-shaped, or figure-eight-shaped path.

Tracking from the communication control apparatus 120 to the ground radio device 30 and tracking from the ground radio device 30 to the communication control apparatus 120 use position information of both. In order for all the ground radio devices 30 installed in the coverage area 20 to be able to link up and communicate, it is necessary to constantly deliver, to all the ground radio devices 30, the position information of the HAPS 100 for the ground radio devices 30 to track the communication control apparatus 120.

The communication control apparatus 120 transmits the position information of the HAPS 100 to a plurality of ground radio devices 30 by broadcasting a beacon including the position information of the HAPS 100.

Figure 3:
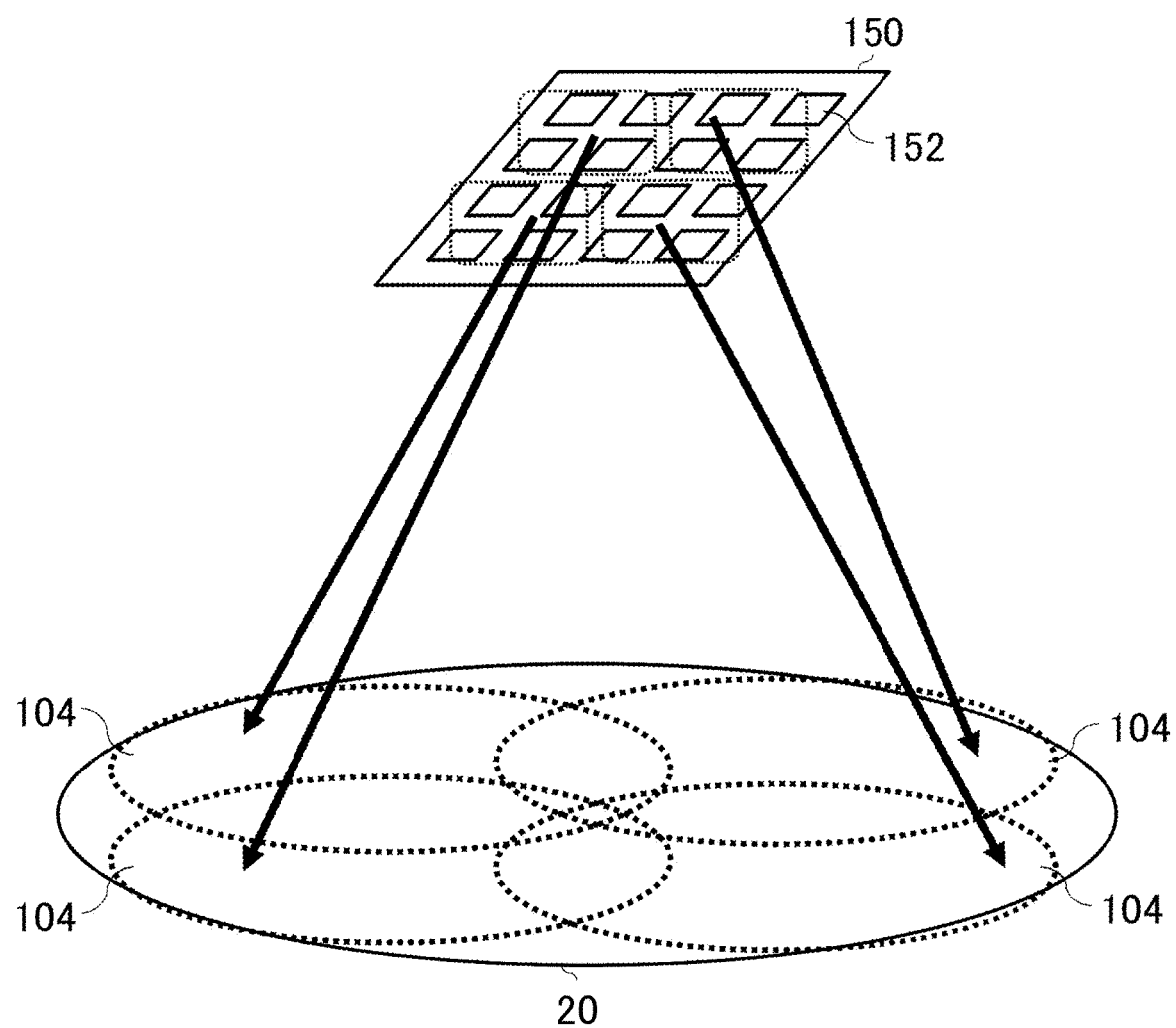
FIG. 3 is an explanatory diagram for explaining a situation of the beacon broadcast area 104 when an altitude of the HAPS 100 changes.
Figure 4:
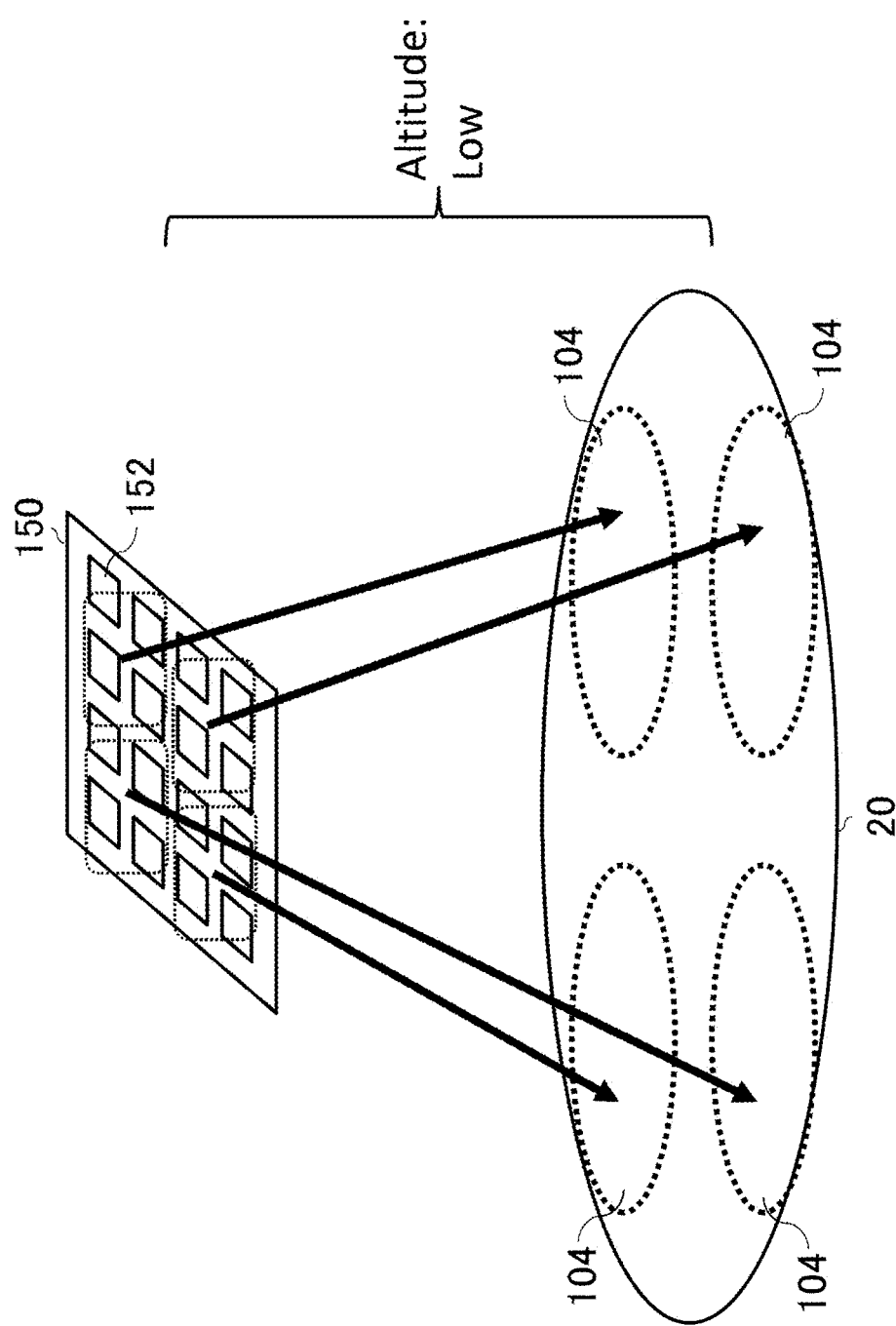
FIG. 4 is an explanatory diagram for explaining a situation of the beacon broadcast area 104 when the altitude of the HAPS 100 changes.
Figure 5:
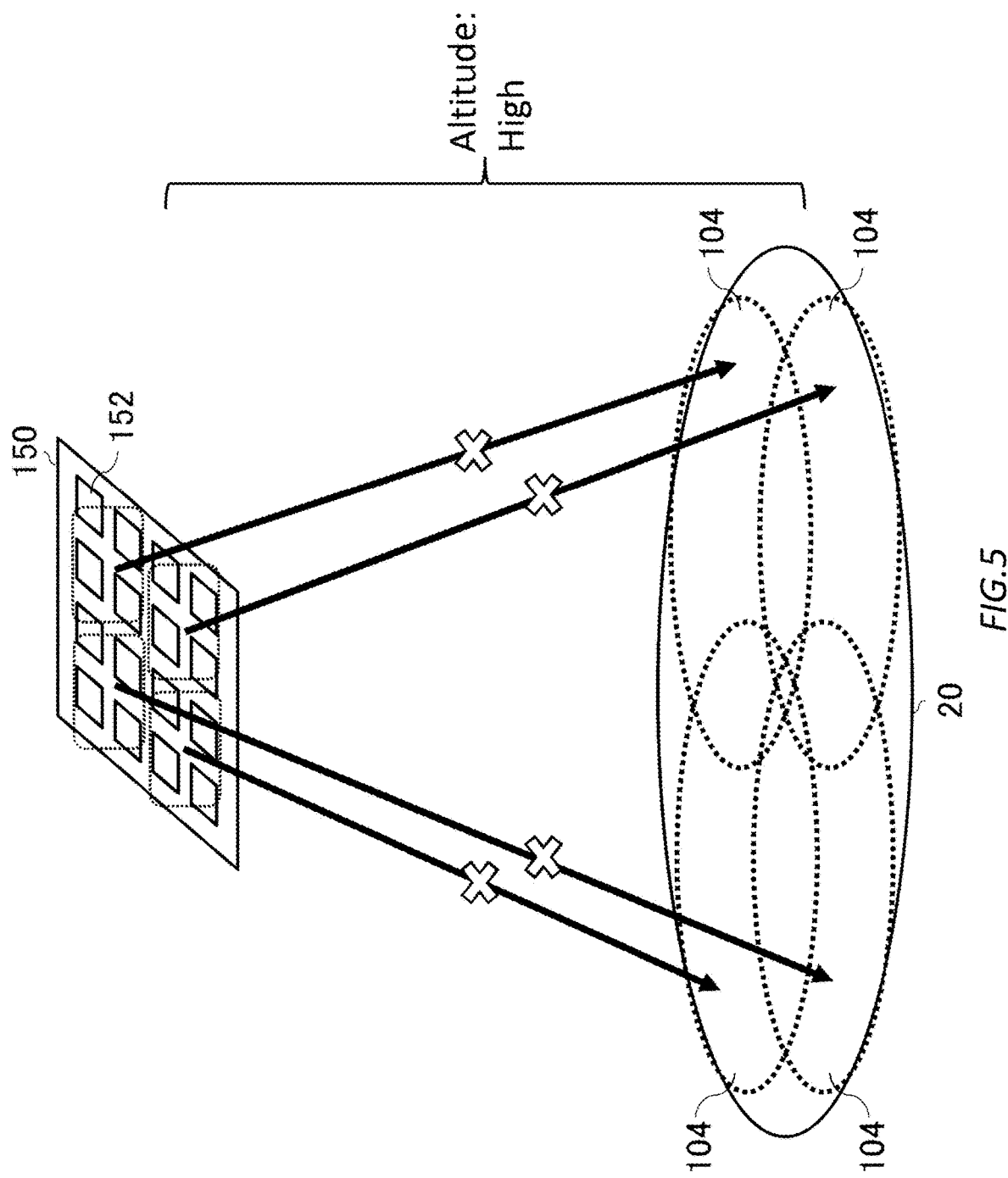
FIG. 5 is an explanatory diagram for explaining a situation of the beacon broadcast area 104 when the altitude of the HAPS 100 changes.

FIGS. 3, 4, and 5 are explanatory diagrams for explaining situations of a beacon broadcast area 104 when the altitude of the HAPS 100 changes. The communication control apparatus 120 groups antenna elements 152 of the antenna 150 and performs divided transmission in order to deliver the beacon to the entire coverage area 20.

The communication control apparatus 120 may use the phased array antenna as the antenna 150, but due to a mechanism of the phased array antenna (a gain and a beam width is determined by the antenna element), it is necessary to divide transmission beams and control a transmission beam angle in order to cover the entire coverage area 20.

During the flight of the HAPS 100, a coverable ground range changes due to the link budget and the beam angle depending on a vertical position of the aircraft, and thus if transmission is performed with a constant beam, there is a possibility that the beacon does not reach the entire coverage area 20.

For example, as illustrated in FIG. 3, when the entire coverage area 20 can be covered by the beacon broadcast area 104, the beacon reaches the entire coverage area 20, but as illustrated in FIG. 4, when an altitude of the antenna 150 decreases, an area covered by each beam changes, and an area that cannot be covered is formed. In addition, as illustrated in FIG. 5, when the altitude of the antenna 150 increases, each beam becomes insufficient in terms of the link budget, and the beacon does not reach its area.

On the other hand, the communication control apparatus 120 according to the present embodiment adjusts a gain (beam angle) of the antenna 150 according to a change in the altitude of the HAPS 100.

Figure 6:
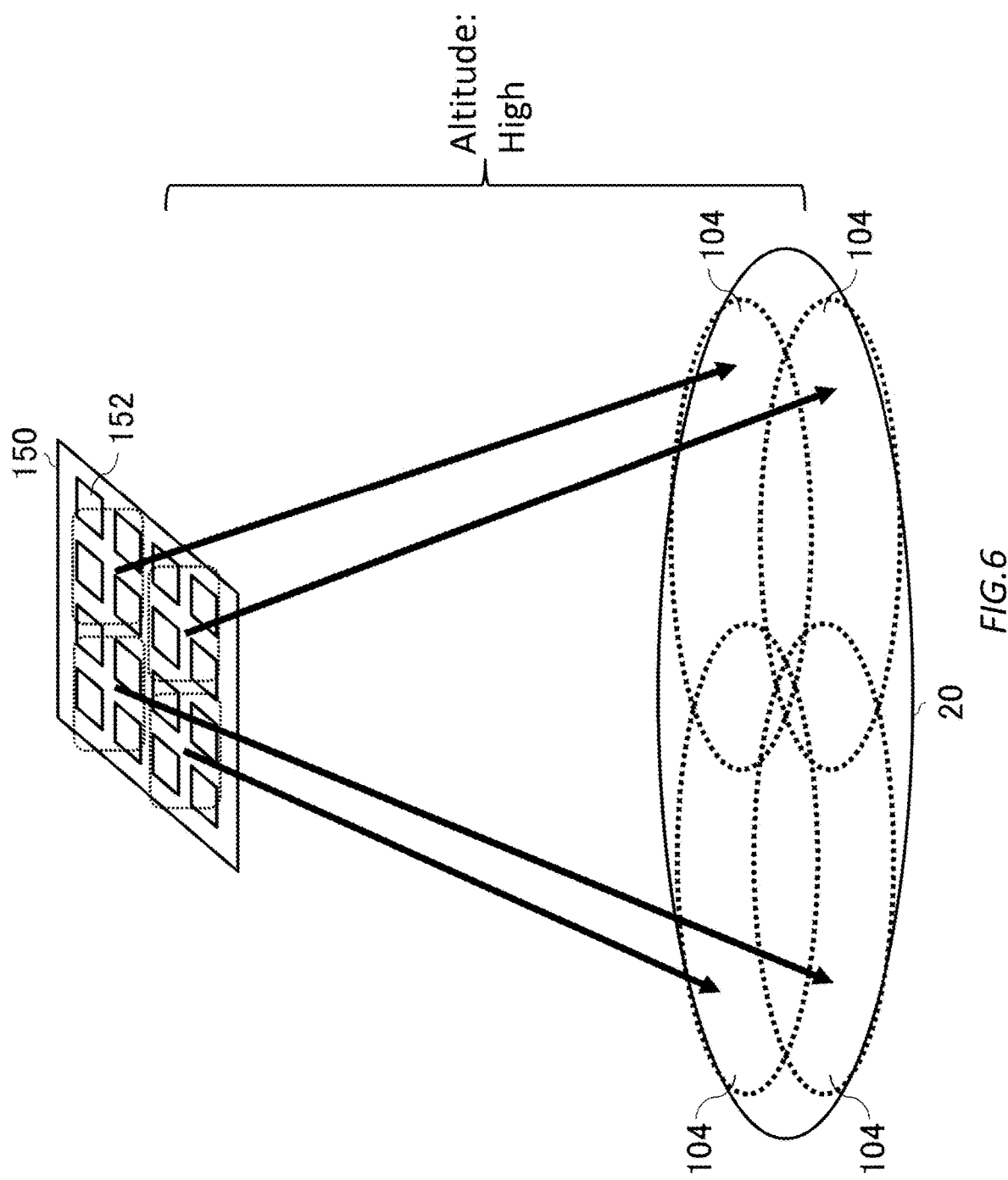
FIG. 6 is an explanatory diagram for explaining adjustment by a communication control apparatus 120.
Figure 7:
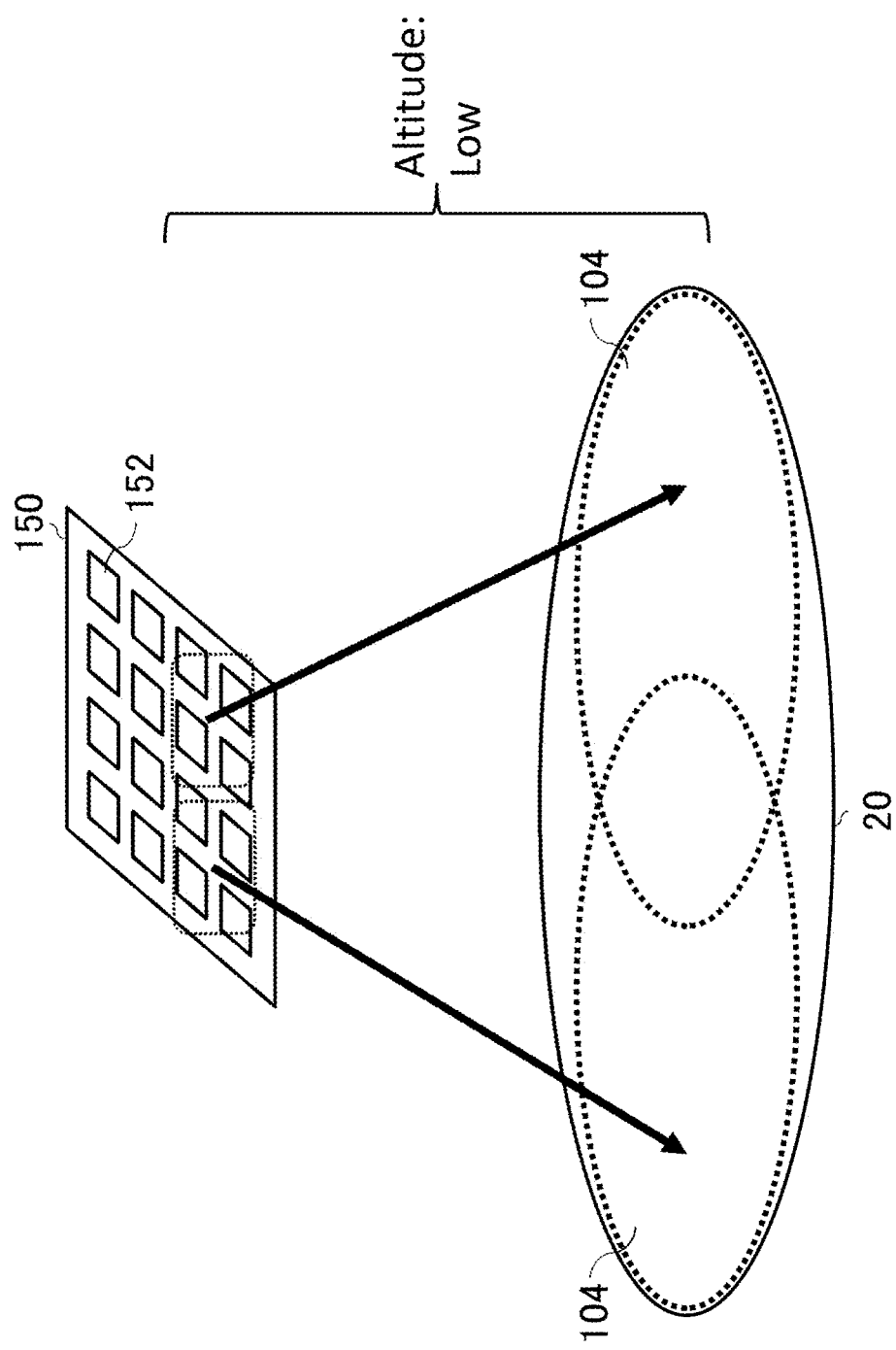
FIG. 7 is an explanatory diagram for explaining the adjustment by the communication control apparatus 120.

FIGS. 6 and 7 are explanatory diagrams for explaining adjustment by the communication control apparatus 120. FIG. 6 illustrates a case where the altitude of the HAPS 100 is relatively high, and FIG. 7 illustrates a case where the altitude of the HAPS 100 is relatively low.

Since the link budget degrades as the altitude of the HAPS 100 increases, the communication control apparatus 120 increases a number of transmission elements of the antenna 150. Since the antenna gain increases and the transmission beam angle narrows when the number of transmission elements is increased, the communication control apparatus 120 increases a number of transmission beams. Accordingly, even if the altitude of the HAPS 100 increases, the beacon can reach the entire coverage area 20.

Since the link budget improves as the altitude of the HAPS 100 decreases, the communication control apparatus 120 reduces the number of transmission elements of the antenna 150. Since the antenna gain decreases and the transmission beam angle widens when the number of transmission elements is reduced, the communication control apparatus 120 reduces the number of transmission beams. Accordingly, even if the altitude of the HAPS 100 increases, the beacon can reach the entire coverage area 20. In addition, it is possible to contribute to energy saving.

Figure 8:
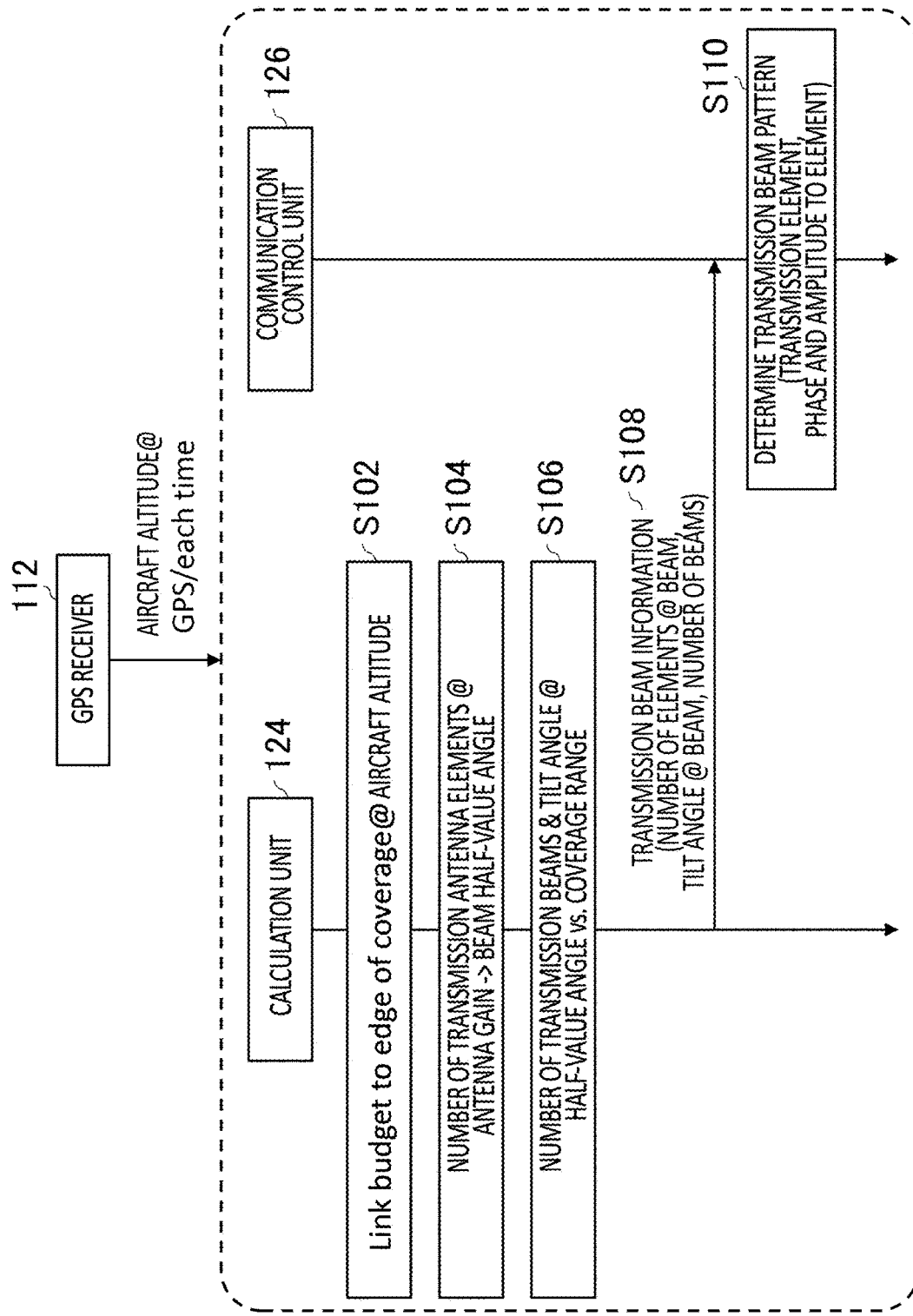
FIG. 8 schematically illustrates an example of a flow of processing by the communication control apparatus 120.
Figure 9:
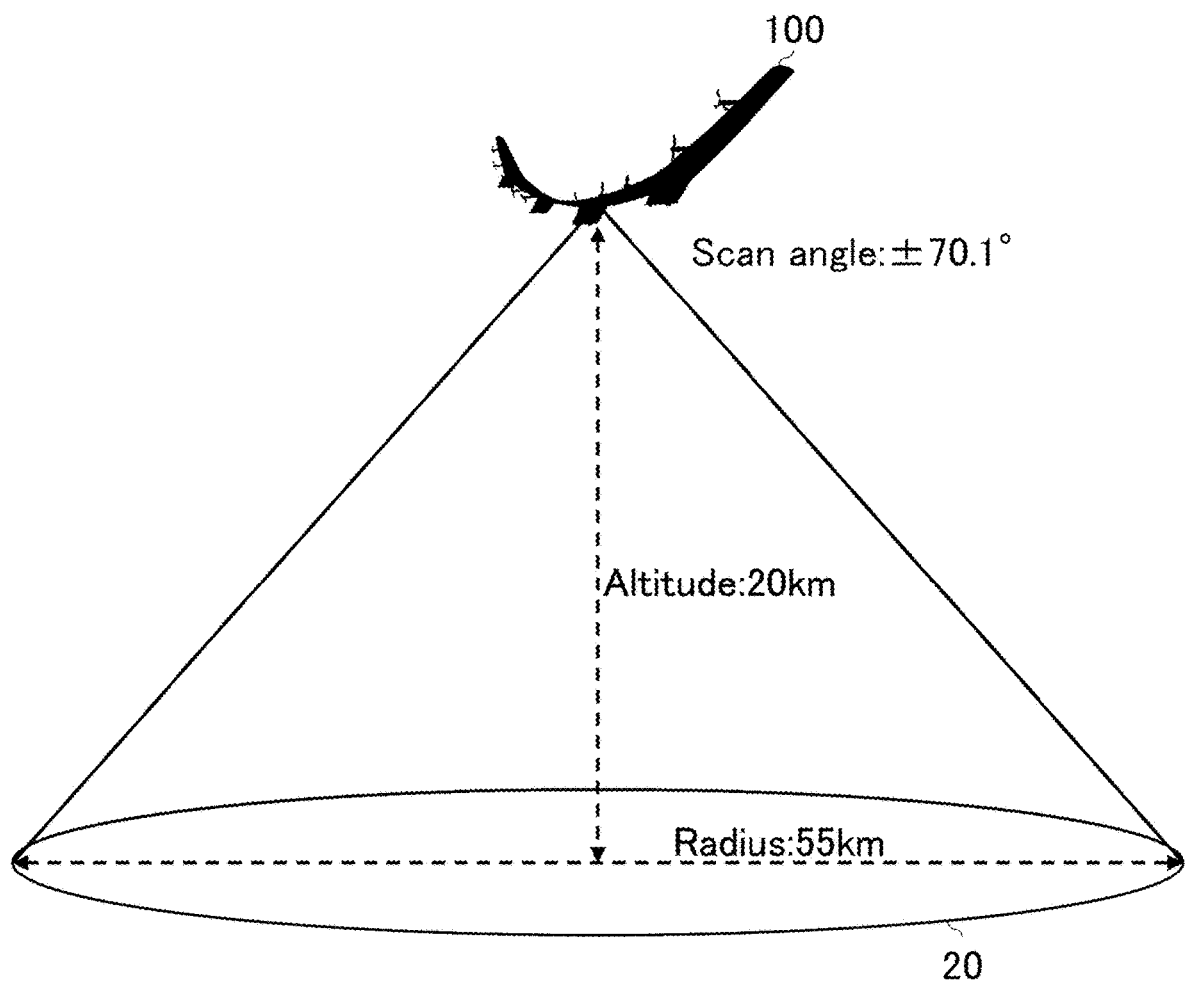
FIG. 9 is an explanatory diagram for explaining a specific example of control by the communication control apparatus 120.
Figure 10:
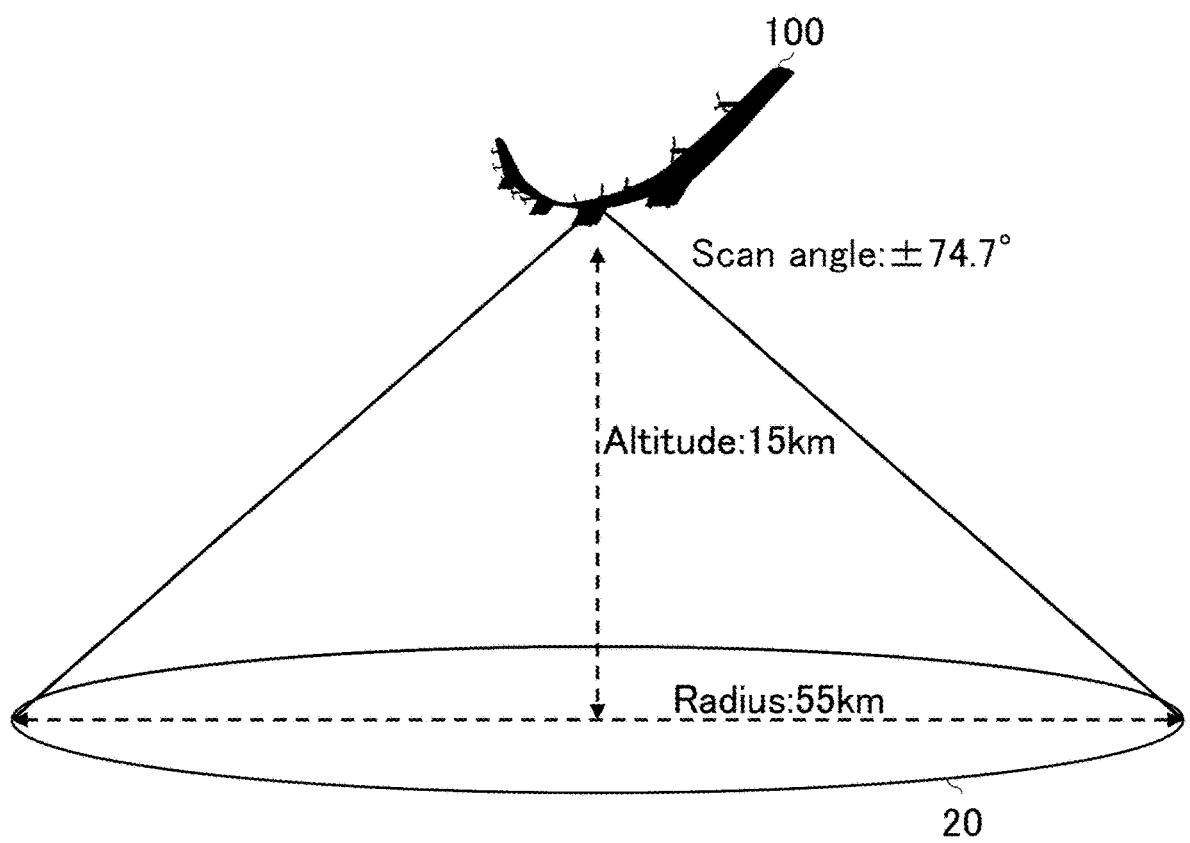
FIG. 10 is an explanatory diagram for explaining a specific example of the control by the communication control apparatus 120.
Figure 11:
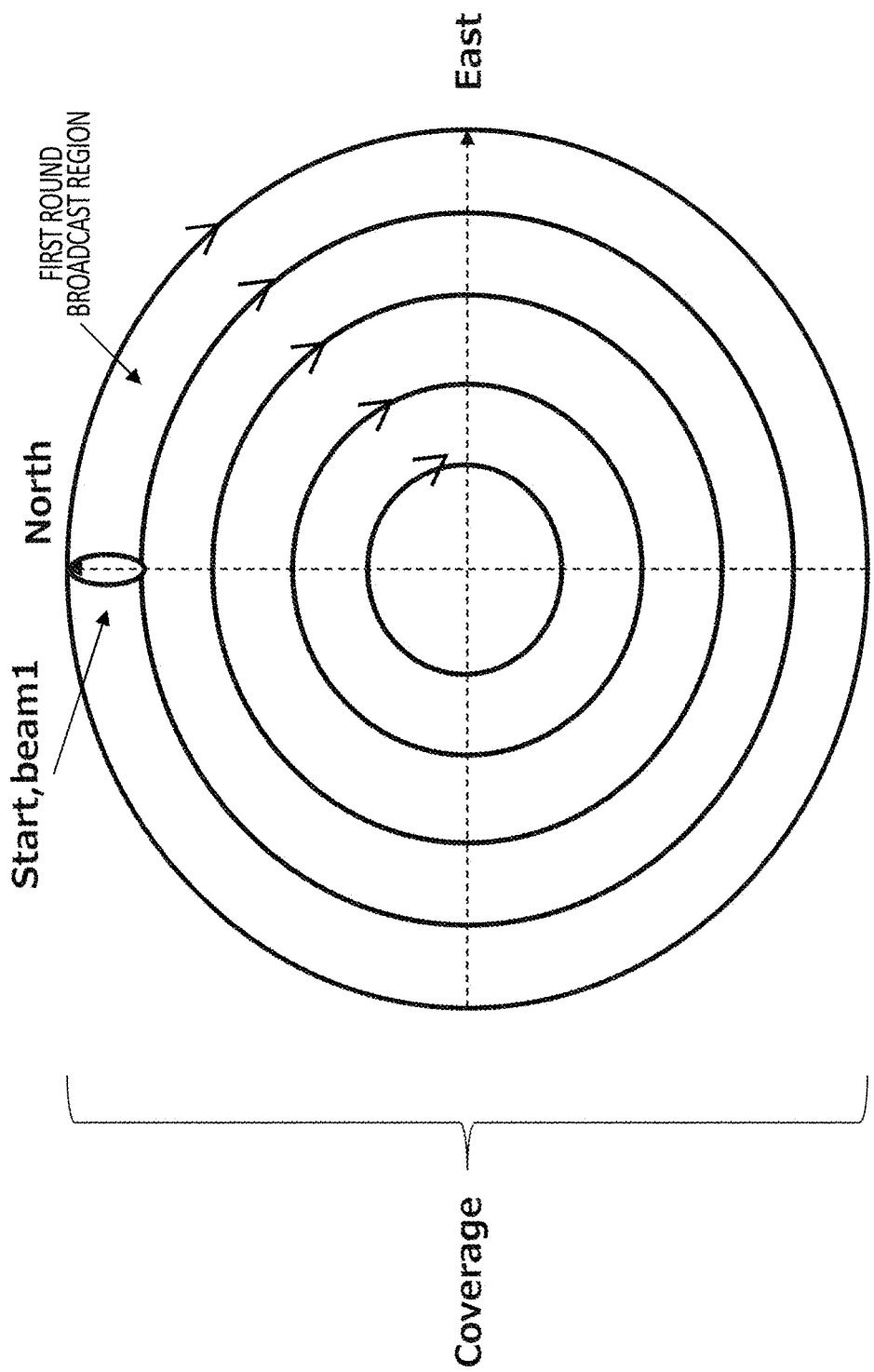
FIG. 11 is an explanatory diagram for explaining a specific example of the control by the communication control apparatus 120.
Figure 12:
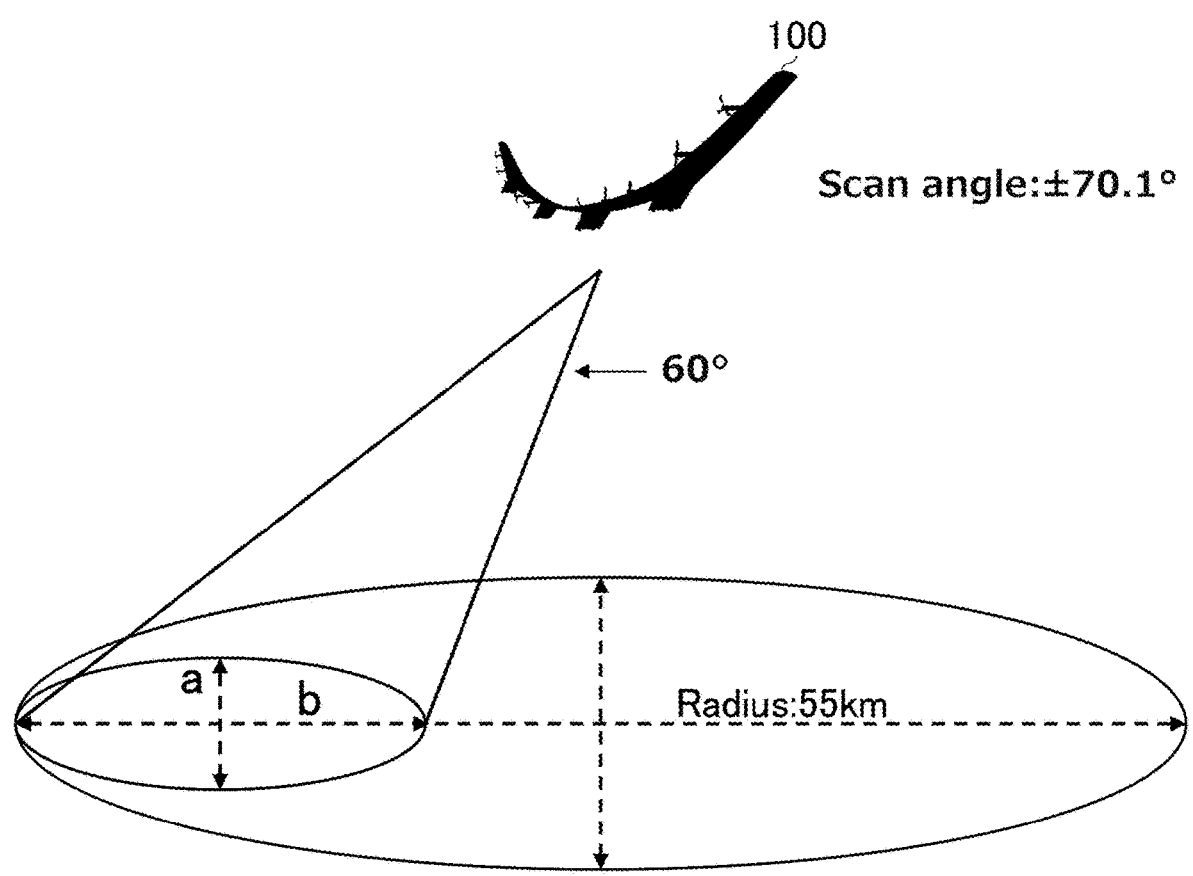
FIG. 12 is an explanatory diagram for explaining a specific example of the control by the communication control apparatus 120.
Figure 13:
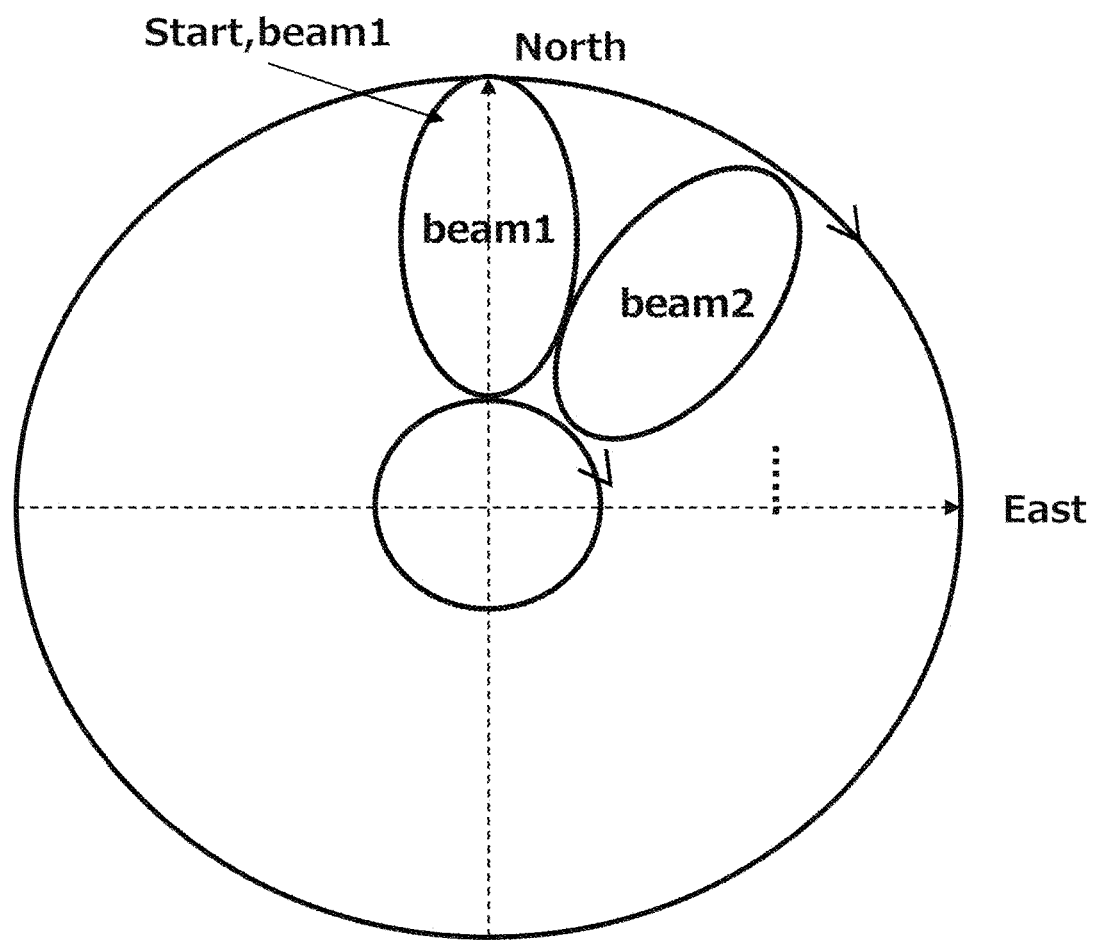
FIG. 13 is an explanatory diagram for explaining a specific example of the control by the communication control apparatus 120.

FIG. 8 schematically illustrates an example of a flow of processing by the communication control apparatus 120. Overall, the position information acquisition unit 122 acquires the position information of the HAPS 100, the calculation unit 124 calculates a number of transmission beams output by the antenna 150, a tilt angle of each beam, and a number of antenna elements used to output each transmission beam, based on the altitude of the HAPS 100, and the communication control unit 126 controls the antenna 150 to output transmission beams according to a result of the calculation by the calculation unit 124.

The position information acquisition unit 122 of the communication control apparatus 120 continuously acquires the position information of the HAPS 100 from the GPS receiver 112. The calculation unit 124 may execute the calculation illustrated in FIG. 8 every time the position information acquisition unit 122 acquires the position information of the HAPS 100.

In step (step may be abbreviated as S) 102, the calculation unit 124 calculates a link budget required to cover the entire coverage area 20 and corresponding to the altitude of the HAPS 100. In S104, the calculation unit 124 calculates a transmission gain, a beam half-value angle, and a number of antenna elements of the antenna 150, from the link budget calculated in S102. In S106, the calculation unit 124 calculates the number of transmission beams and the tilt angle of each beam required to cover the entire coverage area 20, from the beam half-value angle calculated in S104.

In S108, the calculation unit 124 notifies the communication control unit 126 of transmission beam information including the number of transmission beams, the tilt angle of each beam, and the number of antenna elements used to output each beam which are calculated. In S110, the communication control unit 126 determines a transmission beam pattern including transmission elements and a phase and amplitude applied to the elements, from the transmission beam information notified in S108. The communication control unit 126 transmits a beacon including the position information of the HAPS 100 with the transmission beam pattern determined in S110, in accordance with the beacon transmission timing.

FIGS. 9, 10, 11, 12, and 13 are explanatory diagrams for explaining specific examples of control by the communication control apparatus 120. Here, a case where the coverage is designed such that the altitude of the HAPS 100 changes from 20 km to 15 km and the scan angle of the phased array antenna is +70° is described as an example. Note that frequency/bandwidth is 39 GHz/880 MHz, an element gain and an output power of the phased array antenna are 5 dBi/18 dBm, an Rx gain is 50 dBi, beacon broadcast MCS and required SNR are MCS9/−11 dB, and Link Margin is 10 dB.

First, the calculation unit 124 calculates a range of wireless coverage controlled by the communication control unit 126. Then, the calculation unit 124 calculates a link budget required when the altitude of the HAPS 100 is 15 km. The calculation unit 124 calculates a transmission gain, a number of transmission elements, and a beam half-value angle required for the antenna 150, from the calculated link budget. The calculation unit 124 calculates a coverable range (a) up to a coverage edge and a beam tilt angle (I) from the calculated beam half-value angle, calculates a coverage range (b) and a beam tilt angle (II) of a next beam, aligned with the edge of (a), and calculates the ranges and the tilt angles of all beams for completing a round of the coverage edge.

Aligned with an inner edge of the calculated coverage range of the first round, the calculation unit 124 calculates coverage ranges and tilt angles of beams of a second round, similarly to the first round. The calculation unit 124 calculates a number of beams and a tilt angle of each beam required for covering the entire coverage, and updates a transmission beam control table as shown in Table 1 below.

TABLE 1

| TRANSMISSION BEAM NO. | COVERAGE RANGE | TRANSMISSION BEAM TILT ANGLE |
|---|---|---|
| 1 | A | I |
| 2 | B | II |
| 3 | C | III |
| ... | ... | ... |

The required antenna gain calculated by the link budget calculation for the first round of broadcasting is 12.8 dBi, and the required number of antenna elements is 24. The calculation unit 124 calculates the beam half-value angle, and the number of beams and the beam coverage range required in the first round of broadcasting, from the required antenna gain. Since absolute gain (D)=relative gain−2.14=12.8−2.14=10.66 dB=11.64 and absolute gain (D)=4π/θ^2, half-value angle (θ)=(4π/11.64)^½=(41253/11.64)^½≈60°. The required number of beams is 360/60=6, and the beam coverage range is π×a×b.

The calculation unit 124 inputs, to the transmission beam control table, all pieces of calculated beam information of the first round of broadcasting to a last round of broadcasting, and constantly updates the information (a time interval depends on an output resolution of the GPS receiver 112).

TABLE 2

| TRANS-MISSION BEAM NO. | COV-ERAGE RANGE | TRANSMISSION BEAM TILT ANGLE | NUMBER OF ELEMENTS |
|---|---|---|---|
| 1 | A | 60° | 24 |
| 2 | A | 60° | 24 |
| 3 | A | 60° | 24 |
| ... | ... | ... | ... |
| 7 | B | 10° | 4 |
| ... | ... | ... | ... |

Figure 14:
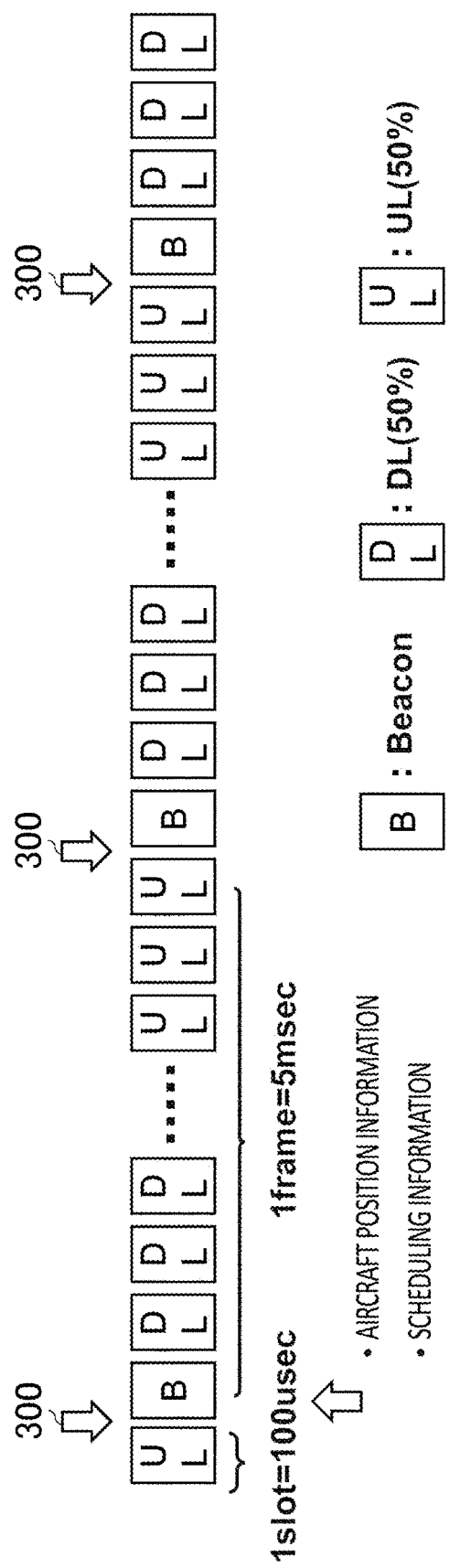
FIG. 14 is an explanatory diagram for explaining an update timing of a transmission beam control table.

FIG. 14 is an explanatory diagram for explaining an update timing of the transmission beam control table. Here, a case where communication is performed based on the IEEE802.11ad standard is described as an example. In the example illustrated in FIG. 14, one slot is 100 us and one frame is 5 ms.

The calculation unit 124 may update the transmission beam control table at an update timing 300 before transmitting the beacon broadcast in beacon timeslots illustrated in FIG. 14. However, parameterization is performed so that the update interval can be set by a frame length.

Figure 15:
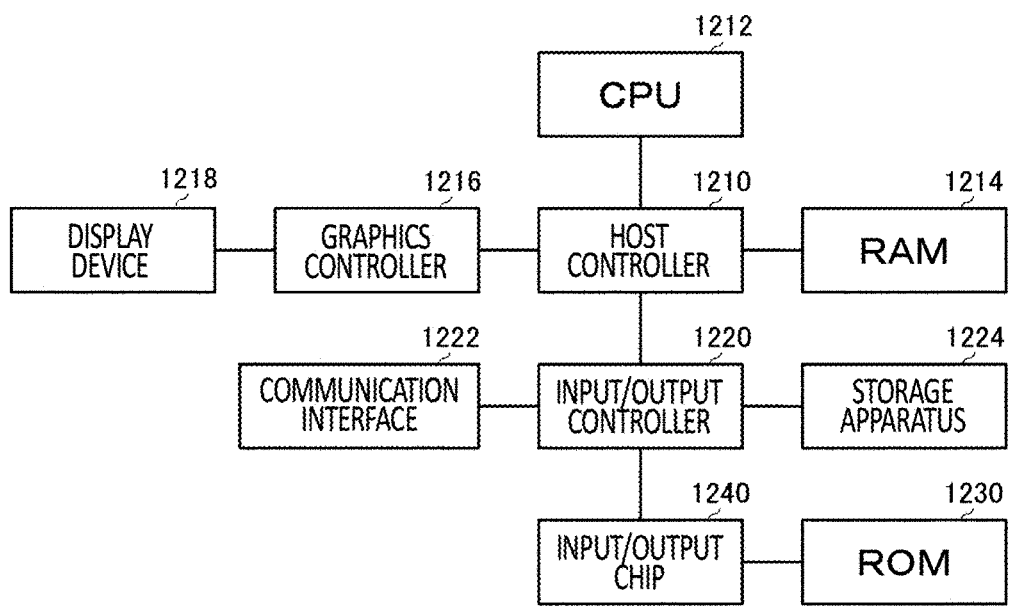
FIG. 15 schematically illustrates an example of a hardware configuration of a computer 1200 functioning as the communication control apparatus 120.

FIG. 15 schematically illustrates an example of a hardware configuration of a computer 1200 functioning as the communication control apparatus 120. Programs installed in the computer 1200 can cause the computer 1200 to function as one or more "units" of the apparatus according to the embodiment described above or can cause the computer 1200 to execute operations associated with the apparatuses according to the embodiment described above or the one or more "units", and/or can cause the computer 1200 to execute a process according to the embodiment described above or stages of the process. Such a program may be executed by a CPU 1212 to cause the computer 1200 to perform particular operations associated with some or all of the blocks in the flowcharts and block diagrams described in the present specification.

The computer 1200 according to the present embodiment includes the CPU 1212, a RAM 1214, and a graphics controller 1216, which are connected to each other via a host controller 1210. Also, the computer 1200 includes input/output units such as a communication interface 1222, a storage apparatus 1224, a DVD drive and an IC card drive, which are connected to the host controller 1210 via an input/output controller 1220. The storage apparatus 1224 may be a hard disk drive, a solid-state drive, and the like. The computer 1200 also includes a ROM 1230 and a legacy input/output unit such as a keyboard, which are connected to the input/output controller 1220 via an input/output chip 1240.

The CPU 1212 operates in accordance with the programs stored in the ROM 1230 and the RAM 1214, thereby controlling each unit. The graphics controller 1216 obtains image data which is generated by the CPU 1212 in a frame buffer or the like provided in the RAM 1214 or in itself so as to cause the image data to be displayed on a display device 1218.

The communication interface 1222 communicates with other electronic devices via a network. The storage apparatus 1224 stores a program and data used by the CPU 1212 in the computer 1200. The IC card drive reads programs and data from an IC card and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer-readable storage medium such as the DVD-ROM or the IC card. The program is read from the computer-readable storage medium, installed into the storage apparatus 1224, RAM 1214, or ROM 1230, which are also examples of a computer-readable storage medium, and executed by the CPU 1212. Information processing written in these programs is read by the computer 1200, and provides cooperation between the programs and the various types of hardware resources described above. An apparatus or method may be configured by implementing the operation or processing of information in accordance with the usage of the computer 1200.

For example, when a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage apparatus 1224, the DVD-ROM, or the IC card, and transmits the read transmission data to a network or writes reception data received from a network to a reception buffer region or the like provided on the recording medium.

In addition, the CPU 1212 may cause all or a necessary portion of a file or a database to be read into the RAM 1214, the file or the database having been stored in an external recording medium such as the storage apparatus 1224, the DVD drive (DVD-ROM), the IC card, etc., and perform various types of processing on the data on the RAM 1214. Next, the CPU 1212 may write the processed data back into the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information search/replacement, or the like described throughout the present disclosure and designated by instruction sequences of the programs, to write the results back to the RAM 1214. In addition, the CPU 1212 may search for information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the said plurality of entries, and read the attribute value of the second attribute stored in the said entry, thereby obtaining the attribute value of the second attribute associated with the first attribute that satisfies a predetermined condition.

The programs or software module described above may be stored on the computer 1200 or in a computer-readable storage medium near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flowcharts and block diagrams in the present embodiments may represent stages of processes in which operations are executed or "units" of apparatuses responsible for executing operations. A specific step and "unit" may be implemented by a dedicated circuit, a programmable circuit supplied along with a computer-readable instruction stored on a computer-readable storage medium, and/or a processor supplied along with the computer-readable instruction stored on the computer-readable storage medium. The dedicated circuit may include digital and/or analog hardware circuits, and may include integrated circuits (IC) and/or discrete circuits. The programmable circuit may include a reconfigurable hardware circuit, such as a field programmable gate array (FPGA), a programmable logic array (PLA), or the like, including logical AND, logical OR, logical XOR, logical NAND, logical NOR, and other logical operations, a flip-flop, a register, and a memory element.

The computer-readable storage medium may include any tangible device capable of storing an instruction executed by an appropriate device, so that the computer-readable storage medium having the instruction stored thereon constitutes a product including an instruction that may be executed in order to provide means for executing an operation designated by a flowchart or a block diagram. An example of the computer-readable storage medium may include an electronic storage medium, a magnetic storage medium, an optical storage medium, an electromagnetic storage medium, a semiconductor storage medium, etc. More specific examples of computer-readable storage medium may include a FLOPPY (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

The computer-readable instructions may include an assembler instruction, an instruction-set-architecture (ISA)

instruction, a machine instruction, a machine-dependent instruction, a microcode, a firmware instruction, state-setting data, or either of source code or object code written in any combination of one or more programming languages including an object-oriented programming language such as SMALLTALK (registered trademark), JAVA (registered trademark), and C++, or the like, and a conventional procedural programming language such as a "C" programming language or a similar programming language.

The computer-readable instruction may be provided to a general-purpose computer, a special purpose computer, or a processor or programmable circuit of another programmable data processing device locally or via a local area network (LAN), a wide area network (WAN) such as the Internet or the like in order that the general-purpose computer, the special purpose computer, or the processor or the programmable circuit of another programmable data processing device executes the computer-readable instruction to generate means for executing operations designated by the flowchart or the block diagram. Examples of the processor include a computer processor, a processing unit, a microprocessor, a digital signal processor, a controller, a microcontroller, and the like.

In the above described embodiment, the description has been provided where the HAPS 100 is used as an example of the flight vehicle which has the antenna for forming the wireless communication area by irradiating the beam towards the ground to provide the wireless communication service to the user terminal in the wireless communication area, but the example is not limited to this. Examples of the flight vehicle include unmanned aerial vehicles such as a balloon, an airship, a plane, and a drone which can form the wireless communication area.

While the present invention has been described by way of the embodiments, the technical scope of the present invention is not limited to the above-described embodiments. It is apparent to persons skilled in the art that various alterations or improvements can be made to the above described embodiments. It is also apparent from the described scope of the claims that the embodiments to which such alterations or improvements are made can be included in the technical scope of the present invention.

It should be noted that the operations, procedures, steps, stages or the like of each process performed by an apparatus, system, program, and method shown in the scope of the claims, embodiments, or diagrams can be performed in any order as long as the order is not indicated by "prior to," "before," or the like and as long as the output from a previous process is not used in a later process. Even if the process flow is described by using phrases such as "first", "then" or the like in the scope of the claims, embodiments, or diagrams, it does not necessarily mean that the process must be performed in this order.

EXPLANATION OF REFERENCES

20: coverage area; 30: ground radio device; 100: HAPS; 102: wireless communication area; 104: beacon broadcast area; 110: flight control apparatus; 112: GPS receiver; 120: communication control apparatus; 122: position information acquisition unit; 124: calculation unit; 126: communication control unit; 150: antenna; 152: antenna element; 160: antenna; 300: update timing; 1200: computer; 1210: host controller; 1212: CPU; 1214: RAM; 1216: graphics controller; 1218: display device; 1220: input/output controller; 1222: communication interface; 1224: storage apparatus; 1230: ROM; and 1240: input/output chip.

What is claimed is:

1. A communication control apparatus which is mounted on a flight vehicle and forms, by using a phased array antenna, a wireless communication area on a ground to provide a wireless communication service to a user terminal in the wireless communication area, the communication control apparatus comprising at least one processor, wherein:
   the at least one processor acquires position information including an altitude of the flight vehicle;
   the at least one processor calculates a number of transmission beams output by the phased array antenna, a tilt angle of each beam, and a number of antenna elements used to output each transmission beam, based on the altitude of the flight vehicle, and updates a transmission beam control table, based on the number of transmission beams, the tilt angle of each beam, and the number of antenna elements which are calculated; and
   the at least one processor controls the phased array antenna to output transmission beams according to a calculation result, by using the transmission beam control table updated by the at least one processor.

2. The communication control apparatus according to claim 1, wherein the at least one processor calculates a link budget for covering a coverage area on the ground, based on the altitude of the flight vehicle, calculates a transmission gain, a beam half-value angle, and the number of antenna elements of the phased array antenna, from the link budget calculated, and calculates the number of transmission beams and the tilt angle of each beam, from the beam half-value angle calculated.

3. The communication control apparatus according to claim 1, wherein the at least one processor controls the phased array antenna to transmit a beacon including the position information of the flight vehicle with the transmission beams in accordance with a beacon transmission timing.

4. A non-transitory computer readable storage medium containing a program for causing a computer to function as:
   a communication control apparatus which is mounted on a flight vehicle and forms, by using a phased array antenna, a wireless communication area on a ground to provide a wireless communication service to a user terminal in the wireless communication area, the communication control apparatus including a position information acquisition unit which acquires position information including an altitude of the flight vehicle, a calculation unit which calculates a number of transmission beams output by the phased array antenna, a tilt angle of each beam, and a number of antenna elements used to output each transmission beam, based on the altitude of the flight vehicle, and updates a transmission beam control table, based on the number of transmission beams, the tilt angle of each beam, and the number of antenna elements which are calculated, and a communication control unit which controls the phased array antenna to output transmission beams according to a calculation result, by using the transmission beam control table updated by the calculation unit.

5. A flight vehicle which forms, by using a phased array antenna, a wireless communication area on a ground to provide a wireless communication service to a user terminal in the wireless communication area, the flight vehicle comprising at least one processor, wherein:
   the at least one processor acquires position information including an altitude of the flight vehicle;

the at least one processor calculates a number of transmission beams output by the phased array antenna, a tilt angle of each beam, and a number of antenna elements used to output each transmission beam, based on the altitude of the flight vehicle, and updates a transmission beam control table, based on the number of transmission beams, the tilt angle of each beam, and the number of antenna elements which are calculated; and the at least one processor controls the phased array antenna to output transmission beams, by using the transmission beam control table updated by the at least one processor.

6. A communication control method executed by a communication control apparatus which is mounted on a flight vehicle and forms, by using a phased array antenna, a wireless communication area on a ground to provide a wireless communication service to a user terminal in the wireless communication area, the communication control method comprising:

acquiring position information including an altitude of the flight vehicle;

calculating a number of transmission beams output by the phased array antenna, a tilt angle of each beam, and a number of antenna elements used to output each transmission beam, based on the altitude of the flight vehicle, and updating a transmission beam control table, based on the number of transmission beams, the tilt angle of each beam, and the number of antenna elements which are calculated; and controlling communication by controlling the phased array antenna to output transmission beams, by using the transmission beam control table updated in the calculating.

* * * * *